US005938091A

United States Patent [19]
Bergin et al.

[11] Patent Number: 5,938,091
[45] Date of Patent: Aug. 17, 1999

[54] SUPERMARKET CART CUP AND ACCESSORY HOLDER

[75] Inventors: Peter W. A. Bergin, Eden Prairie; Bruce D. Clark, Orono, both of Minn.

[73] Assignee: Media Technology Source, Inc., Minneapolis, Minn.

[21] Appl. No.: 08/877,256

[22] Filed: Jun. 17, 1997

Related U.S. Application Data

[63] Continuation-in-part of application No. 08/717,130, Sep. 20, 1996, abandoned.

[51] Int. Cl.$^{6}$ .......... B60N 3/10

[52] U.S. Cl. .......... 224/411; 224/554; 224/526

[58] Field of Search .......... 224/411, 926, 224/281, 484, 482, 547, 554, 409, 274; 280/33, 992; D7/620

[56] References Cited

U.S. PATENT DOCUMENTS

| | | | |
|---|---|---|---|
| D. 257,113 | 9/1980 | McCaffrey | D7/620 X |
| D. 365,250 | 12/1995 | Bergin et al. | D7/620 |
| 984,225 | 2/1911 | Knapp . | |
| 1,673,083 | 6/1928 | Locke | 224/547 X |
| 4,557,452 | 12/1985 | Khuong | 248/214 |
| 4,606,523 | 8/1986 | Statz et al. | 248/311.2 |
| 4,821,931 | 4/1989 | Johnson | 224/42.42 |
| 4,942,990 | 7/1990 | White | 224/926 |
| 5,048,733 | 9/1991 | Nagy | 224/42.42 |
| 5,118,063 | 6/1992 | Young, Sr. | 248/311.2 |
| 5,169,108 | 12/1992 | Carlson | 248/311.2 |
| 5,180,088 | 1/1993 | de Angeli | 224/42.42 |
| 5,180,089 | 1/1993 | Suman et al. | 227/547 |
| 5,330,145 | 7/1994 | Evans et al. | 248/311.2 |
| 5,362,077 | 11/1994 | Adamson | 280/33.992 |
| 5,421,638 | 6/1995 | Ayotte et al. | 297/188.04 |
| 5,490,653 | 2/1996 | Ingwersen | 248/311.2 |
| 5,494,306 | 2/1996 | Adamson et al. | 280/33.992 |

FOREIGN PATENT DOCUMENTS

| | | | |
|---|---|---|---|
| 3615839 | 1/1987 | Germany | 224/482 |

*Primary Examiner*—Renee S. Luebke
*Attorney, Agent, or Firm*—Westman, Champlin & Kelly, P.A.

[57] ABSTRACT

A cupholder that is mountable on the interior of a supermarket cart and which includes flanges that can be used for directly mounting the cupholder to the cart wall, or for slidably fitting into a track which in turn is mounted on the cart wall. The cupholder can be moved along the track to permit moving it out of the way of packages that are stacked in the cart. The cupholder can be adapted to fit onto end walls, sidewalls, or even onto the child seat in the handle area of a cart and can be made to move with folding cart walls or placed in regions left clear when empty carts are nested together so that it is out of the way when the carts are stacked. The cup holder can be supported using a hanger that fits over the upper edge of the supermarket cart wall and is then retained in place.

16 Claims, 5 Drawing Sheets

15
26
16
10
22
28
48
56
28
24
20
18
40
32
16

SUPERMARKET CART CUP AND ACCESSORY HOLDER

CROSS REFERENCE TO RELATED APPLICATION

This application is a continuation-in-part of our application Ser. No. 08/717,130, filed Sep. 20, 1996 and now abandoned, entitled SUPERMARKET CART CUPHOLDER.

BACKGROUND OF THE INVENTION

This invention relates to a cupholder that is mountable in a conventional shopping cart and positioned for holding not only a cup but also accessories such as coupons, pencils, pads or the like. The cupholder is mounted onto a wall of the cart, either permanently or as a slip-on holder using a hanger type support. The holder can be slid to positions least likely to interfere with items that are placed into the cart.

Conventionally, shopping carts are made in several styles and have a wheeled frame, with either a wire or a plastic basket mounted on the frame. The basket is used for holding products that are to be purchased while in a supermarket or store. The baskets are generally made so that the carts will nest together. Some baskets fold upwardly, while other baskets have folding rear walls which move upwardly when the carts are nested. Carts also have folding child seats adjacent the handle.

Various wire racks have been used with shopping carts as auxiliary supports, and there have been wire cupholders that will mount onto handle portions of a shopping cart.

SUMMARY OF THE INVENTION

This invention relates to a cup or drink container holder (called a cupholder) that is mountable on a shopping cart for convenience of a user. It preferably includes not only a receptacle for receiving a drink cup or container, but also receptacles for coupons, wallets, pencils and pens, etc. The cupholder is easily mounted onto the sidewall or end wall of a shopping cart. The cupholder can be fixed in place or can be removably mounted with a hanger type bracket. The hanger bracket also can be fixed in place, if desired.

As shown in one form of the invention, the cupholder may be mounted for slidable movement on a longitudinally extending track between a plurality of positions along the track. The track in turn is attached to the shopping cart itself.

The cupholder is a molded unit, preferably, which has flanges or a hanger used for mounting directly to the cart or for sliding in a track. The selection of how to mount it can be made by the user.

The cupholder can mount in a suitable location, such as a side wall or an end wall of the cart. When the carts are formed so that the entire basket folds up, the cupholder is preferably mounted on the sidewall of the cart. In most carts there are spaces that are not occupied when the carts are nested, and that area is used for mounting the cupholder.

The cupholders shown are easily formed, and finds wide utility in shopping cart applications to free the hands of a user, and to temporarily store things such as store coupons and pens and pencils, as well as shopping lists.

DETAILED DESCRIPTION OF THE PREFERRED EMBODIMENTS

Figure 1:
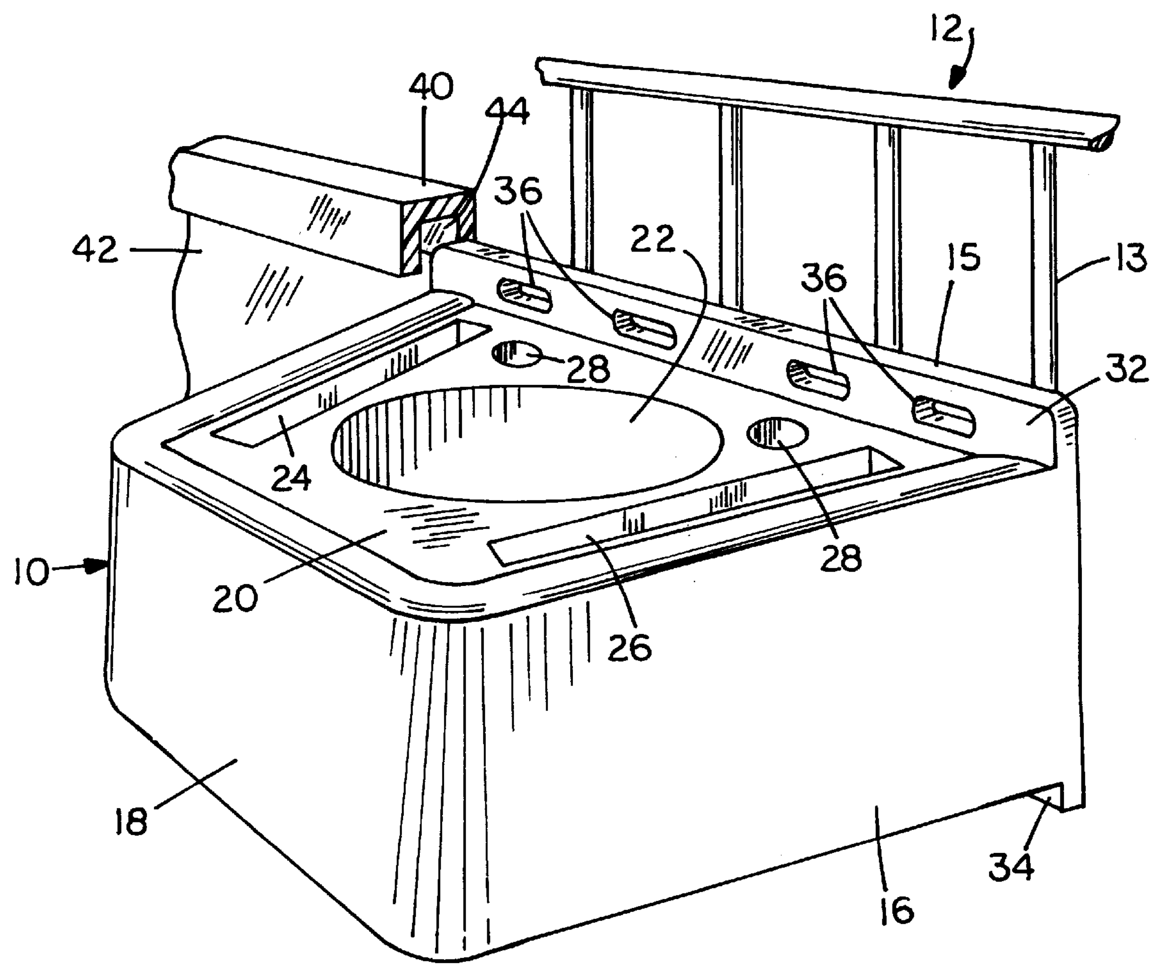
FIG. 1 is a perspective view of a cupholder shown mounted in a shopping cart, which is fragmentarily illustrated for illustrative purposes.

Referring to FIG. 1, a cupholder made according to the present invention is indicated generally at 10, and is mounted onto a shopping cart 12, which has a wall 13 shown as a wire cart wall. The shopping cart 12 is a conventional cart and is a manually movable cart having wheels on a support frame (not shown) that supports the wall 13.

The cupholder 10 is molded from a suitable plastic, and has a base wall 15, sidewalls or flanges 16 that join the base wall, and a front wall 18. A top wall 20 is provided with a drink cup holder receptacle molded downwardly therefrom and indicated at 22. Additionally, the receptacle 22, which is of size to receive a cup or can of desired configuration, is flanked by a pair of pockets 24 and 26, respectively, that have slot openings of sufficient length to receive and hold store coupons or “cents back” coupons that are commonly used in grocery shopping.

A pair of cylindrical pockets 28 also can be provided for holding pens or pencils. The base wall 15 forms an upper flange 32 and a lower flange 34. The flanges 32 and 34 each have a plurality of openings 36 therein. The openings in the upper flange are shown.

Figure 3:
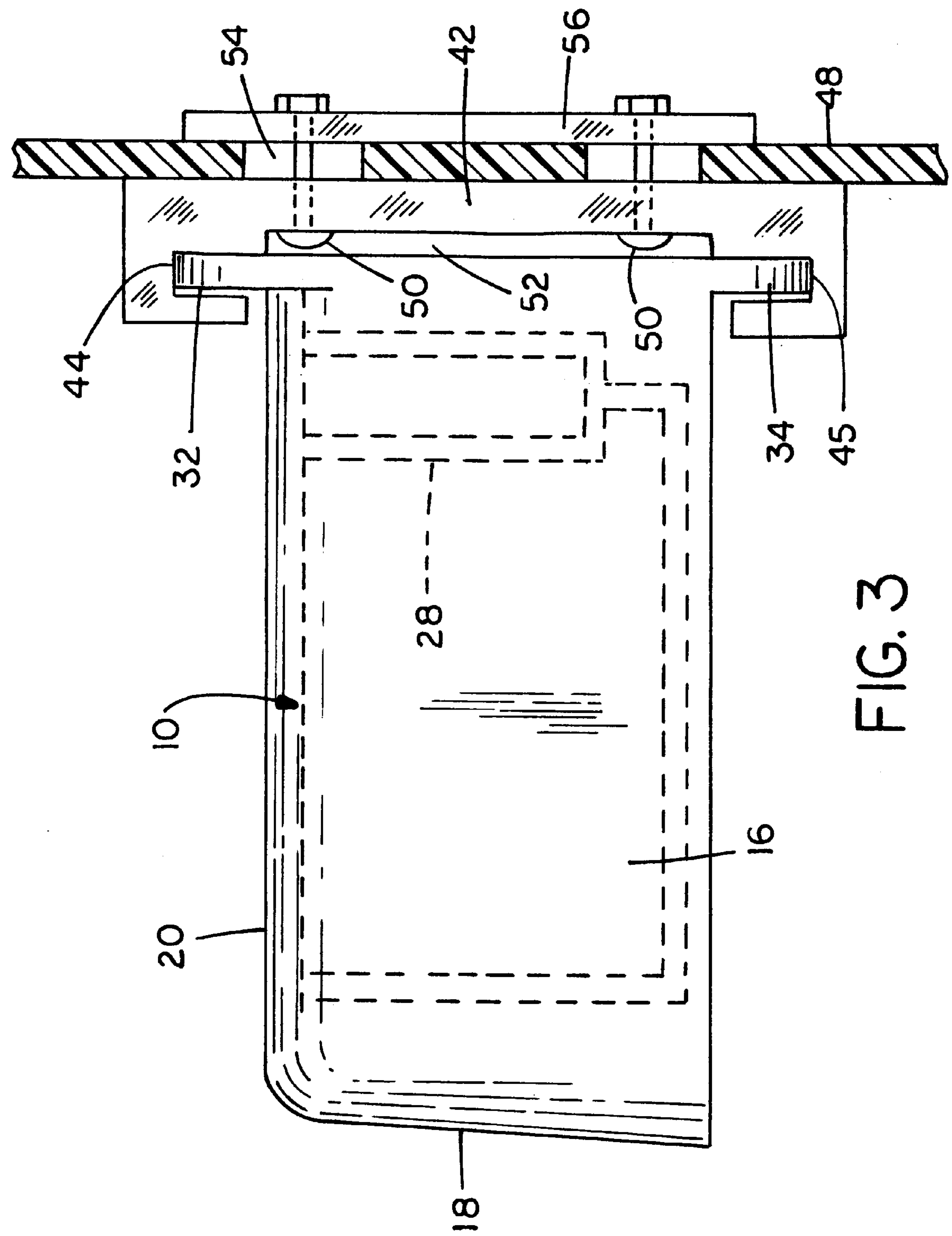
FIG. 3 is a side elevational view of the cupholder of FIG. 2 shown in place in the track.

In the first form of the invention, these flanges are used as supports that fit into receptacles of a guide track 40. The track 40, as can perhaps best be seen in FIG. 3 has a base wall 42, and inverted U-shaped guide receptacles 44 and 46 at the top and bottom, respectively. These receptacles receive the flanges 32 and 34, respectively, for slidably mounting the cupholder 10 and permitting movement of the cupholder along the length of the track.

Figure 2:
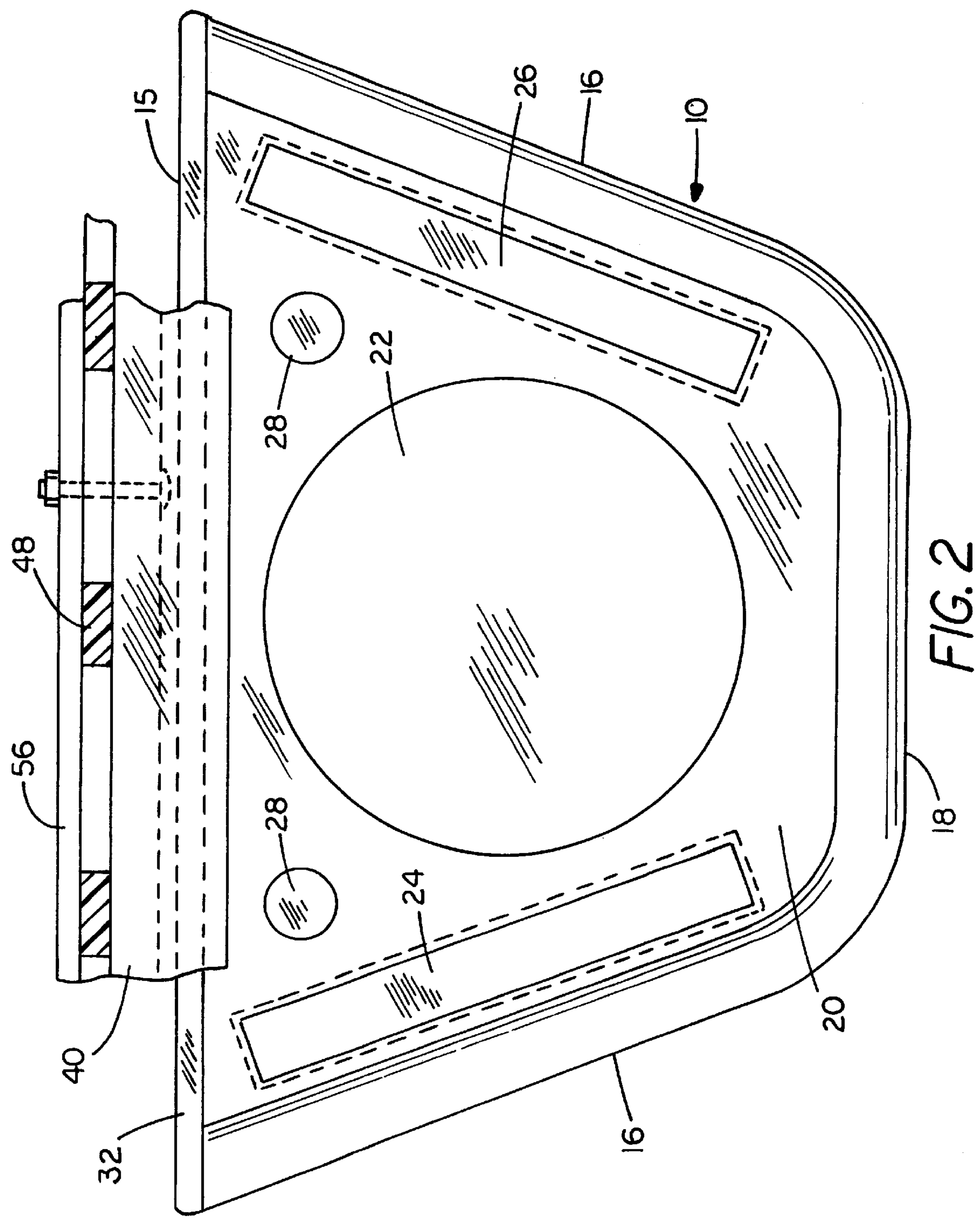
FIG. 2 is a top plan view of the cupholder of FIG. 1 shown mounted onto a track, which is also shown fragmentarily.

While the full length of the track 40 is not illustrated, the top view of FIG. 2 shows that it extends along the supermarket cart wall, which is indicated at 48, and is the type of wall that would be a plastic or molded wall cart for illustrative purposes.

The track 40 can be mounted onto the wall 48, or the wall 13 through the use of suitable cap screws 50 which pass through the base 42, and wherein the cap screw heads can fit into a recess 52 that is formed in the track 40. The cap screws 50 can pass through apertures 54 in the supermarket cart wall 48, or between the wires 13 the wall 13, and secure clamp straps 56 to the outside of the wall 48. The clamp straps 56 can be held securely with lock nuts or the like which do not snag or catch on objects easily.

Figure 4:
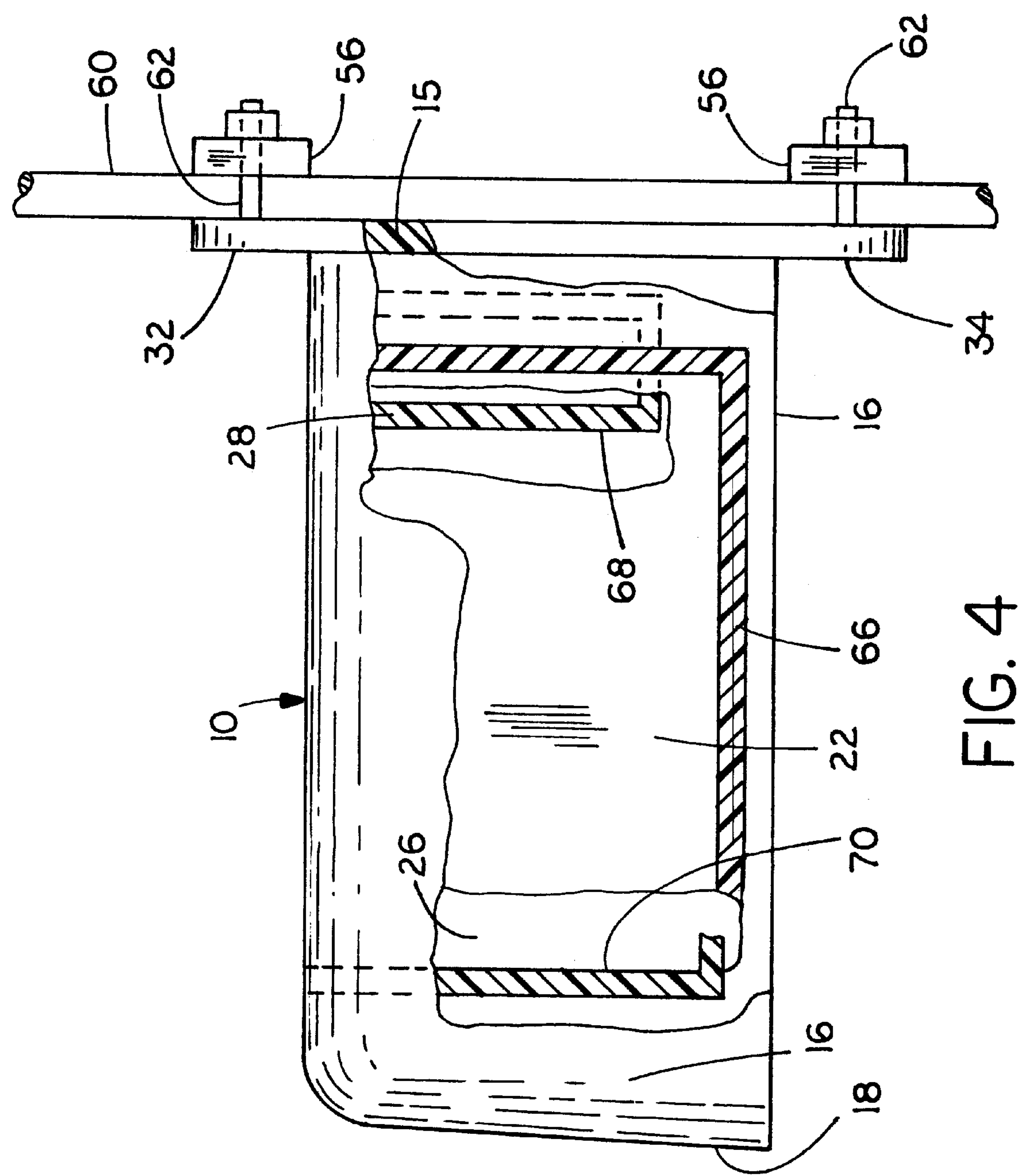
FIG. 4 is a side view of a cupholder of the present invention applied directly against the sidewall of a shopping cart.

The flanges 32 and 34 and apertures 36 are also used for attaching the cupholder directly to the sidewall of a shopping cart as illustrated in FIG. 4. The same clamp straps 56 can be used as with the track 40. A separate clamp strap 56 will be used for the top and the bottom flanges. The wall 60 of a shopping cart would thus support the flanges 32 and 34. Suitable countersunk cap screws or round headed carriage bolts 62 would be passed through the apertures 36 on both the top and bottom flanges, and then bolted in place to clamp the sidewall 60 in position using the clamp straps 56 for backing. The wall 60 could be either a molded wall or a wire wall of a shopping cart. The direct attachment utilizes the same flanges as those used for the tracks and gives an additional benefit to the cupholder.

The receptacles 22, 24, 26 and 28 are generally molded in place with walls that are surrounded by the sidewalls 16 and front wall 18. As shown fragmentarily in FIG. 4, the depending wall of the cupreceptacle 22 is shown at 66. A typical pencil holder or pen holder wall is illustrated at 68. The coupon holder pockets are formed with walls 70. The surrounding skirt or walls 16 and 18 shield the internal molded walls.

Figure 5:
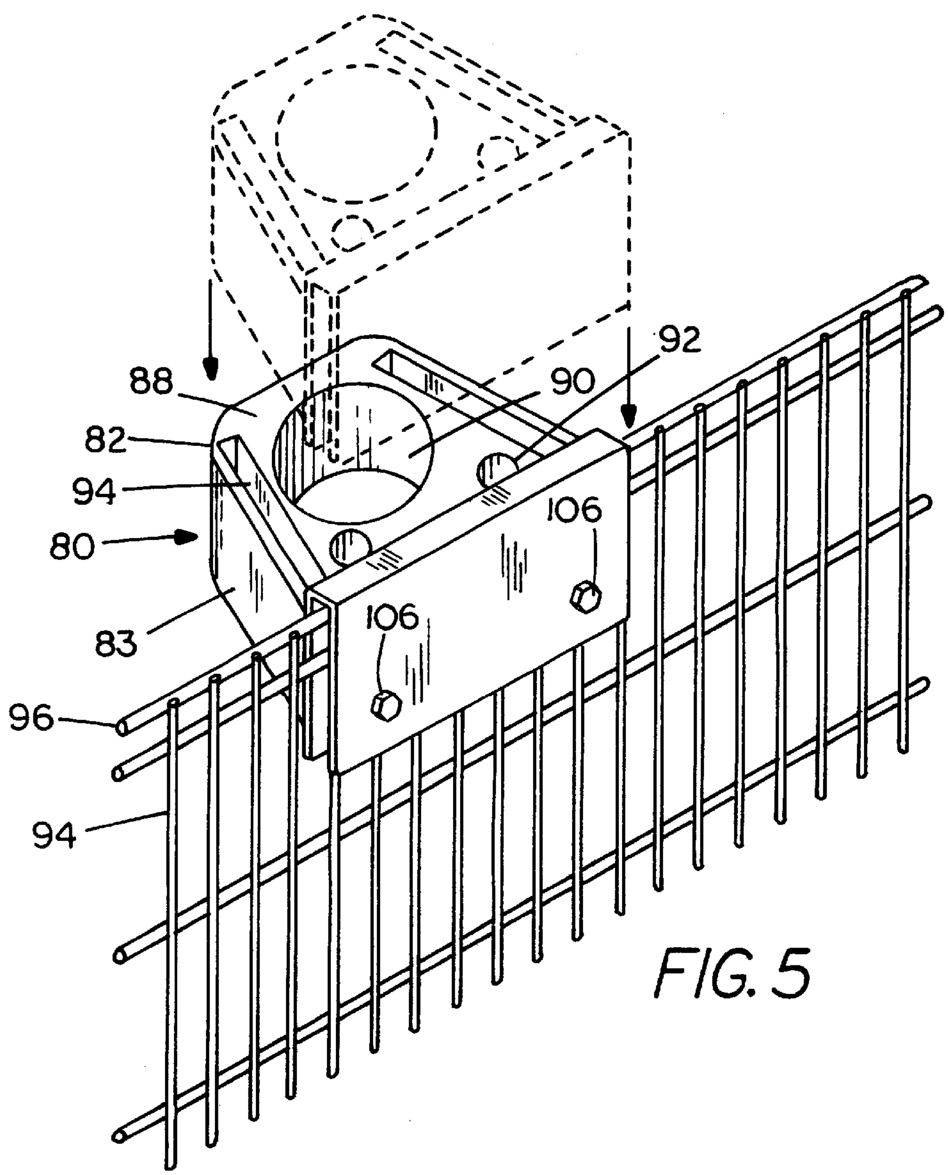
FIG. 5 is a modified form of the cupholder used with a removable hanger type bracket for support.
Figure 6:
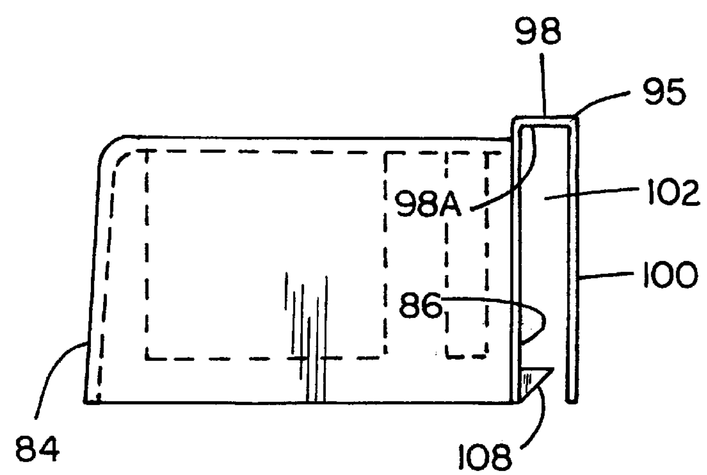
FIG. 6 is a view showing optional fasteners to secure the cupholder in place.

Referring to FIGS. 5 and 6, a second form of the supermarket cart cupholder is shown at 80. The supermarket cart cupholder in this form of the invention includes a molded cupholder member 82 that has side walls 83, and a front wall 84. The cupholder has a base or rear wall 86, and a top wall 88.

A receptacle 90 is formed inwardly from the top wall, for receiving a cup or can as in the first forms of the invention.

Also, cylindrical pockets 92 can be provided as in the first form of the invention, and elongated pockets 94 are positioned along the sides for receiving coupons, wallets, or other items that will fit into this type of pocket.

In this form of the invention, the supermarket cart cupholder is provided with a support hanger indicated generally at 95, which comprises a top or cross wall 98 and a depending wall 100 that joined to top wall 98 and is spaced from the base wall 86 of the cupholder. This forms a U-shaped receptacle 102 so that it is a type of a hanger that will fit over the side wall 94 of a supermarket cart that is illustrated schematically.

The top rail 96 of the supermarket cart wall will support the under surface 98A of the top or cross wall 98, and if the hanger bracket wall 100 is not secured, the cupholder can be slid along the top rail 96 to any desired position.

The support for the cupholder is adequate because of the depth of the U-shaped receptacle 102, and if desired, as shown in FIG. 5, suitable fasteners 106 can be passed through the openings in the vertical slats of the supermarket cart wall 94 and screwed partially into the base wall 86 to hold the cupholder very securely in place. Alternatively, threaded nuts could be molded into the base wall 86, and the fasteners 106 extended through the hanger bracket wall 100.

A modification of a fastener is to use a bump or latch dog 108 that is near the open end of the U-shaped receptacle 102 (FIG. 6). The bump or latch dog is of size to leave a minimum clearance with wall 100 that is less than the diameter of the top rod or rail 96. The latch dog 108 would prevent the cupholder from being slid up easily and removed from the supermarket cart until the wall 100 had been moved or bent outwardly from the base wall 86.

The supermarket cart cupholder thus is removable, and is easily installed by merely placing the receptacle 102 above the top rail 96 of a suitable wall of the supermarket cart, and sliding it down into position.

The other features of the invention are the same as in the first form of the invention, and the present form provides for adjustment along the rail 96 quite easily, and also provides for removal and replacement.

The long receptacles for the coupons can be placed to extend in direction of the flanges 32 and 34, between the base wall and the receptacle 22. Several accessory pockets can be formed in desired locations.

The cupholder may have an opening in the bottom wall, formed with cross supports, if desired. The depth of the drink cup receptacle is selected to support various size cups.

Although the present invention has been described with reference to preferred embodiments, workers skilled in the art will recognize that changes may be made in form and detail without departing from the spirit and scope of the invention.

What is claimed is:

1. A cupholder adapted for mounting onto a shopping cart, the cupholder comprising a housing having a base end, and a top wall supported on the base end, the top wall having a receptacle for a drink cup formed in the housing and opening to the top wall, the top wall further having a pair of depending pockets on opposite sides of the receptacle for the drink cup, and at least one of the pockets being of size to hold coupons, which are used by shoppers;

at least one flange on the base end and extending in a plane generally perpendicular to the plane of the top wall and parallel to a central axis of the receptacle, and a supporting member for supporting the at least one flange relative to a wall of a basket of a shopping cart.

2. The cupholder of claim 1, wherein said supporting member comprises a track for slidably receiving said at least one flange for supporting the cupholder.

3. The cupholder of claim 2, wherein said track member includes first and second guide portions for stabilizing the cupholder.

4. The cupholder of claim 1, wherein said supporting member comprises a threaded fastener that engages the flange.

5. The cupholder of claim 4, wherein said fastener engages a support strap forming a clamp in association with the flange.

6. The cupholder of claim 1, wherein said top wall has at least one depending pocket forming a separate receptacle adjacent to and separated from the receptacle for the drink cup.

7. The cupholder of claim 1, wherein said top wall has at least one holder aperture formed and open to the top wall that supports a pen.

8. The cupholder of claim 1, wherein there are flanges at a top edge and at a bottom edge of the base end, and a surrounding skirt formed of sidewalls and a wall opposite from the base end, the sidewalls being attached to the base end and supported by the flanges.

9. The cupholder of claim 1, wherein the base end has flanges at a top edge and at a bottom edge of the base end, and wherein said supporting member comprises a track having guide receptacles at top and bottom edges thereof, said track supporting the flanges at both the top edge and bottom edge of the base end of the cupholder for slidable movement along the length of the track.

10. The cupholder of claim 1, wherein said supporting member comprises a support wall extending outwardly from at least one flange adjacent an upper side of the top wall.

11. The cupholder of claim 10, wherein said support wall has a dependent wall attached thereto and spaced from the back end to define a receptacle for receiving a wire wall of a supermarket cart basket.

12. A combination of a wheeled shopping cart having a basket with a plurality of side walls defining a space, and a cupholder for mounting onto a shopping cart side wall, comprising a cupholder housing having a base wall lying generally along a plane, a top wall generally perpendicular to the plane and supported on the base wall, a receptacle formed on the cupholder and opening through the top wall, said receptacle being of size to support a drink cup, and a hanger bracket secured to the top wall, including a depending wall that is generally parallel to and spaced from the base wall, said depending wall being spaced from the base wall sufficiently only to receive the side wall of the shopping cart between the base wall and the depending wall, and a peripheral skirt wall joined to the base wall and edges of the top wall, said skirt wall being spaced from the receptacle and extending from the top wall a distance sufficient to shield the receptacle from exterior view.

13. The cupholder of claim 12, wherein said depending wall is supported on a support wall that is parallel to the top wall and extends from the top wall, said depending wall being a continuous wall that extends substantially along a lateral dimension of the support wall.

14. A combination of a supermarket cart having a basket with a peripheral wall defining a space, the peripheral wall having an upper edge, and a cupholder mounted onto the upper edge of the supermarket cart wall comprising a housing having a base wall on the interior of the supermarket cart, and a hanger bracket for supporting the base wall on the supermarket cart wall, said hanger bracket having a support wall extending generally perpendicular to the base wall and lying across the upper edge of the supermarket cart wall, the housing having a depending wall spaced from the base wall and positioned on the exterior of the supermarket cart wall, and a cup receptacle supported by said base wall in position on the interior of the shopping cart, including a top wall that is supported from the base wall, and a cup support wall depending from the top wall and being accessible through an opening in the top wall, said receptacle being of size to support a drink cup.

15. The cupholder of claim 14, and a lock device for locking the hanger bracket onto the peripheral wall.

16. The cupholder of claim 14, and a fastener extending through the depending wall and engaging the base wall, said fastener spanning the space between the depending wall and the base wall.

* * * * *